Figure 1:
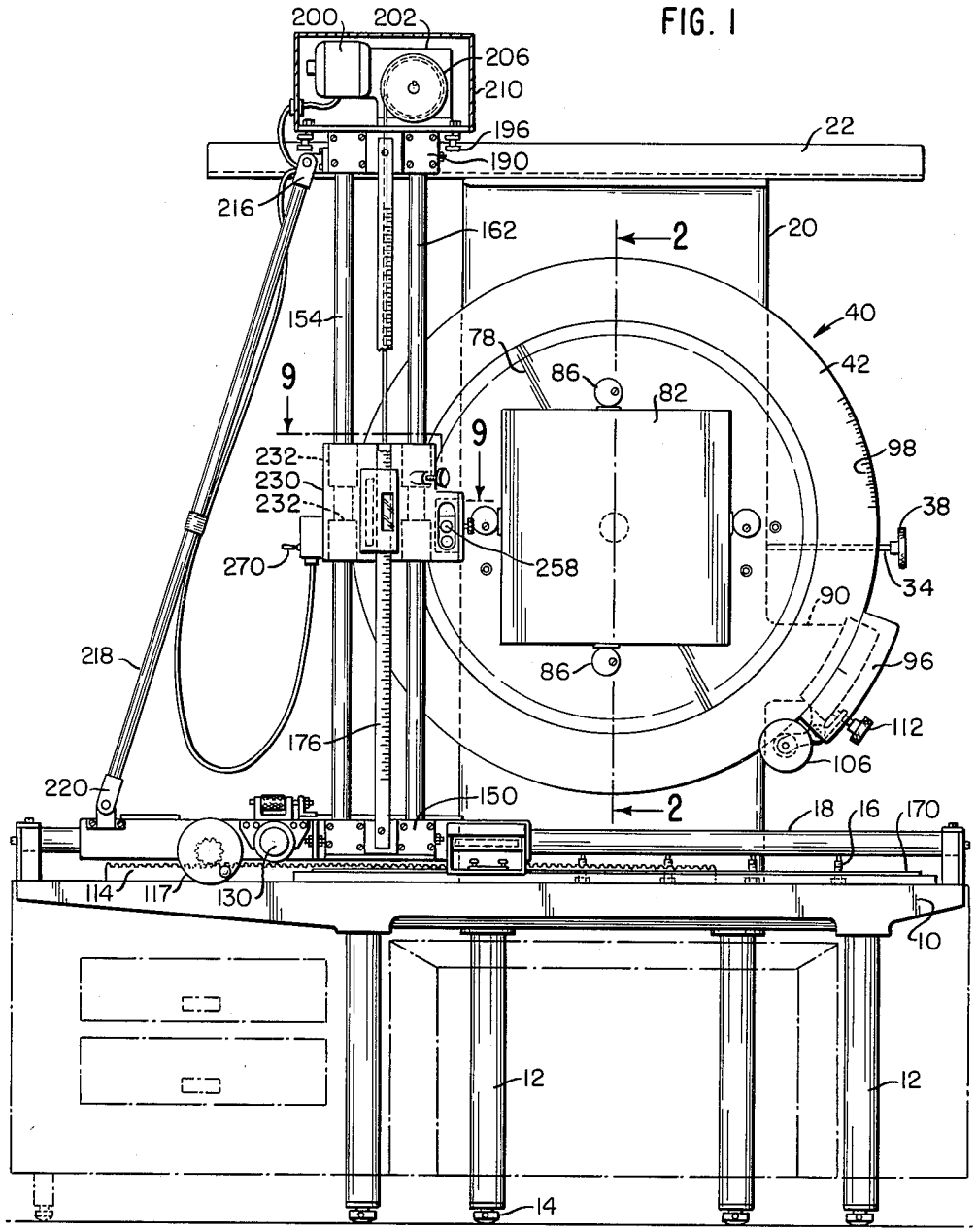

INVENTORS
ALBERT C. BIDWELL
ROBERT T. BORCK
BY
ATTORNEYS

Nov. 9, 1965        A. C. BIDWELL ETAL        3,216,114
             PRECISION SCRIBING MACHINE
Filed May 21, 1962                          5 Sheets-Sheet 2
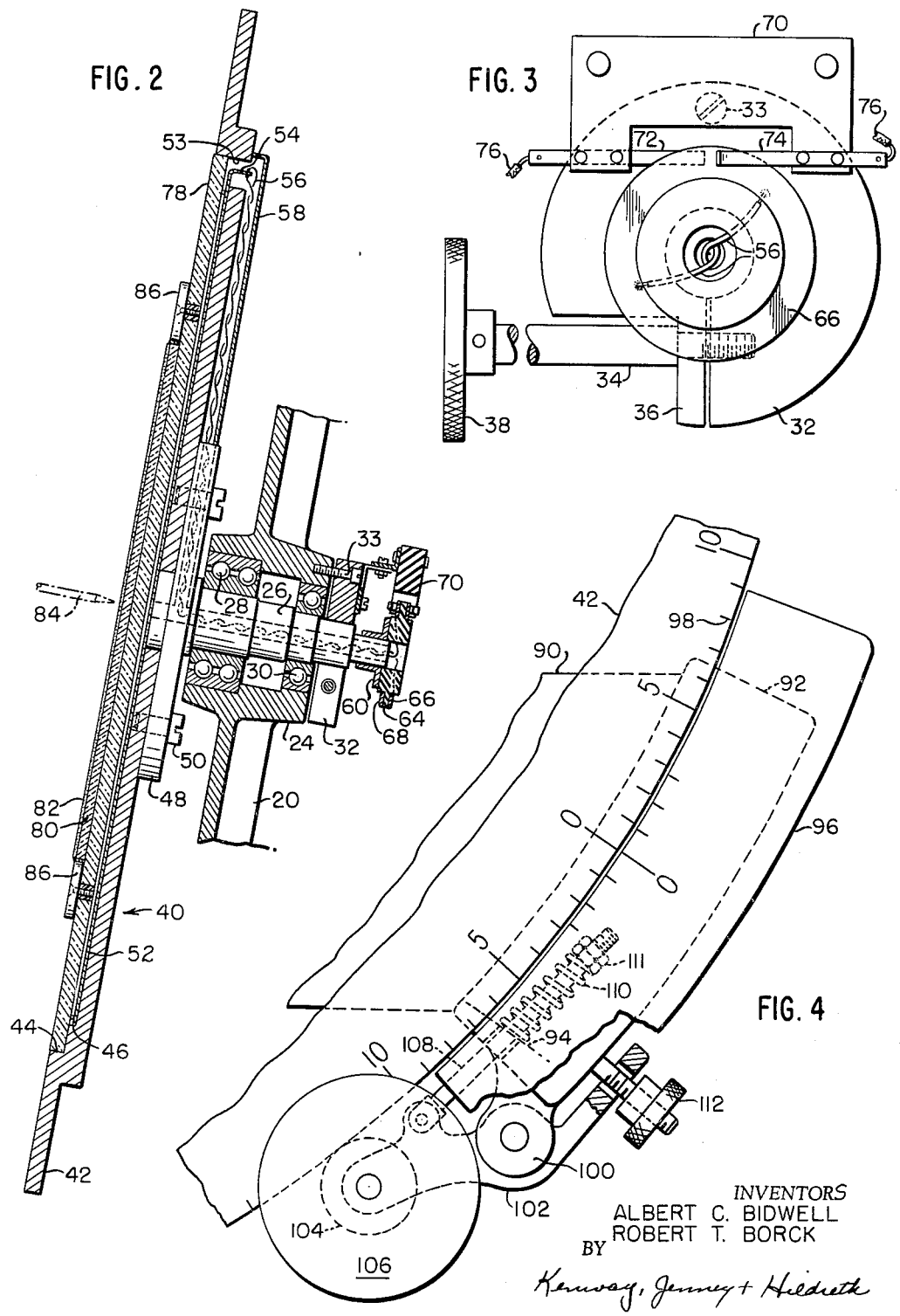
INVENTORS
ALBERT C. BIDWELL
ROBERT T. BORCK
BY
Kenway, Jenney + Hildreth
ATTORNEYS

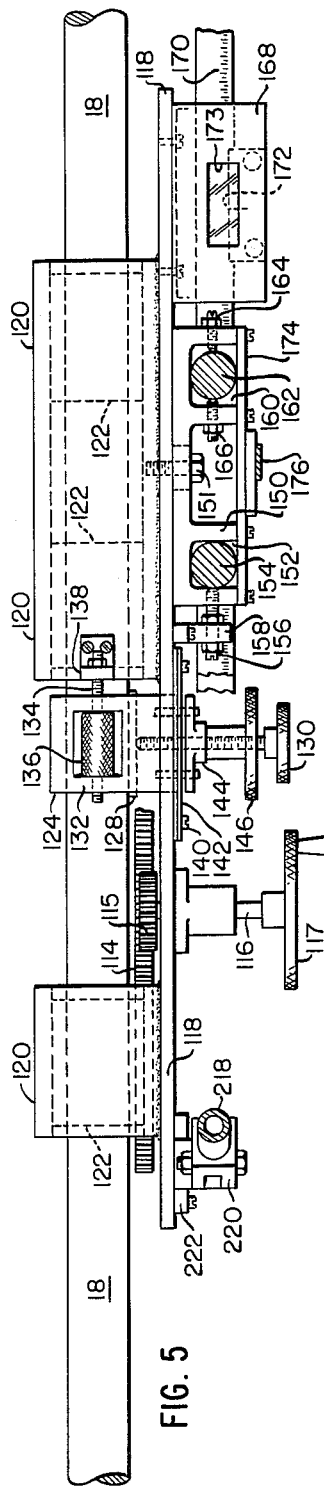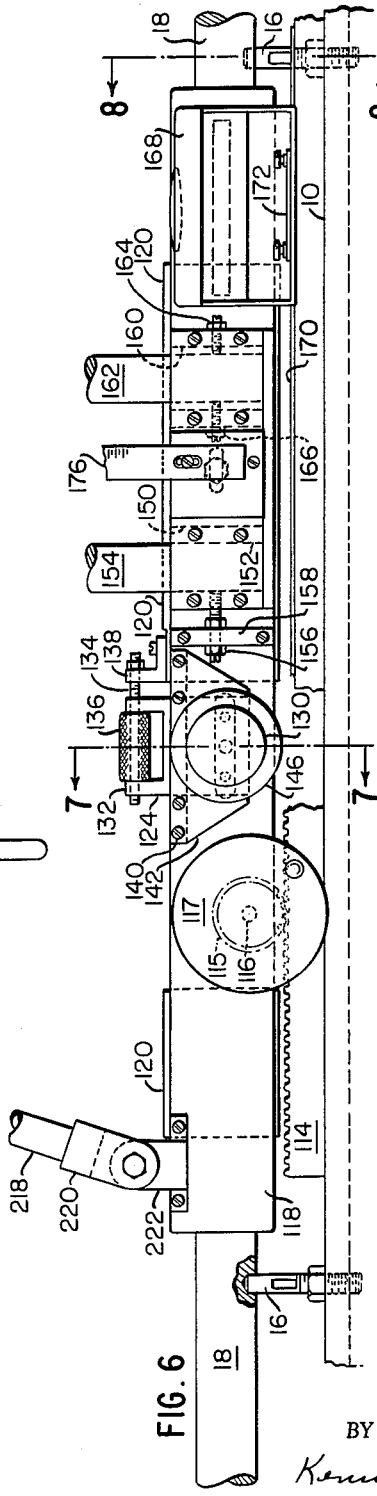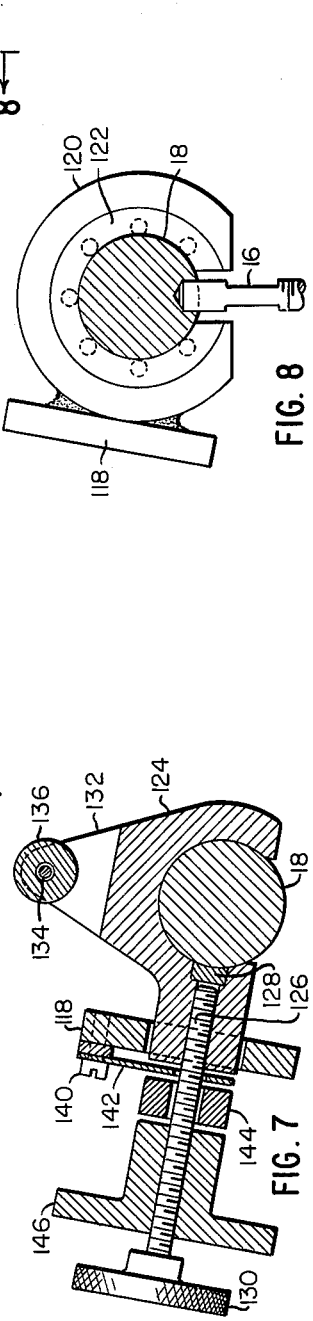

Nov. 9, 1965     A. C. BIDWELL ETAL     3,216,114
PRECISION SCRIBING MACHINE
Filed May 21, 1962     5 Sheets-Sheet 4
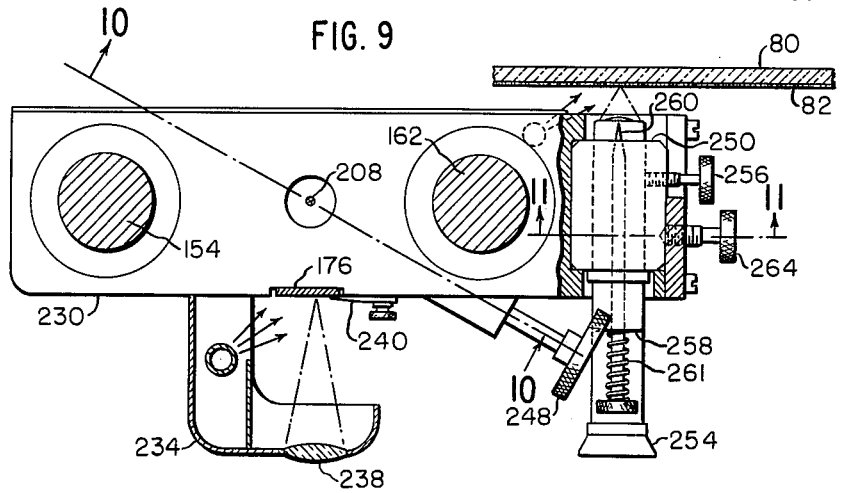
INVENTORS
ALBERT C. BIDWELL
ROBERT T. BORCK
BY
Kenway, Jenney + Hildreth
ATTORNEYS Nov. 9, 1965    A. C. BIDWELL ETAL    3,216,114
PRECISION SCRIBING MACHINE
Filed May 21, 1962    5 Sheets-Sheet 5
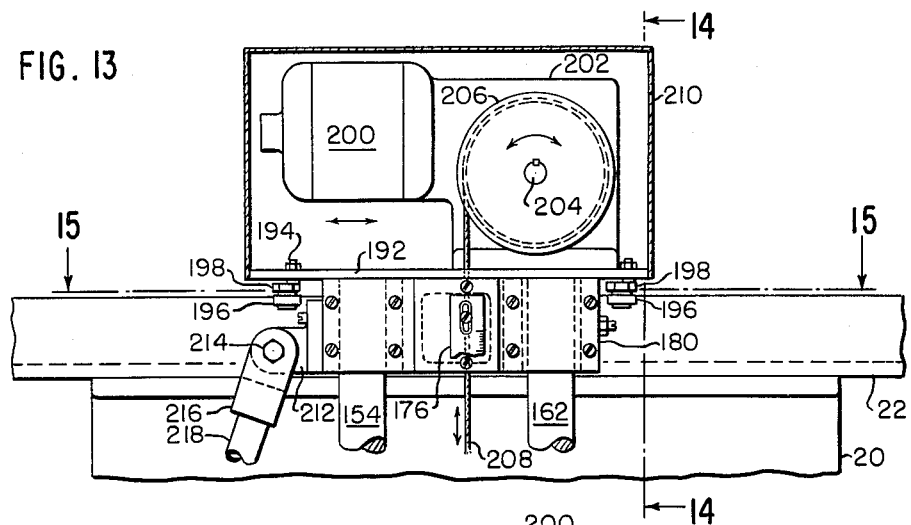
FIG. 13
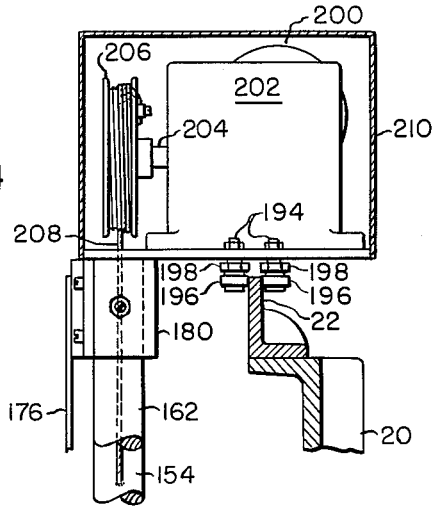
FIG. 14
FIG. 15
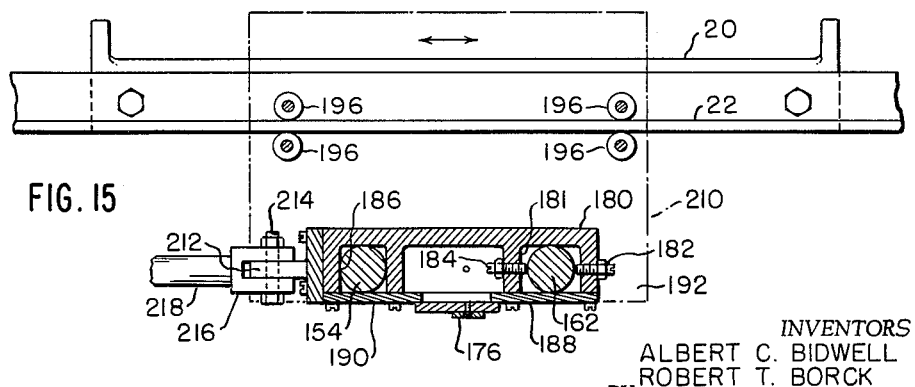
INVENTORS
ALBERT C. BIDWELL
ROBERT T. BORCK
BY Kenway, Jenney + Hildreth
ATTORNEYS United States Patent Office 3,216,114
Patented Nov. 9, 1965

3,216,114
PRECISION SCRIBING MACHINE
Albert C. Bidwell, Lynn, and Robert T. Borck, Marblehead, Mass., assignors to Commerce Engraving, Inc., Lynn, Mass., a corporation of Massachusetts
Filed May 21, 1962, Ser. No. 196,156
2 Claims. (Cl. 33—26)

This invention relates to scribing machines and in particular to a machine for scribing points and lines by reference to X and Y axes, wherein the coordinate points may be located with great precision.

For several years manufacturers have advantageously made use of templates and transparent layout charts for optical comparison with manufactured samples of corresponding products. The optical comparison reveals whether or not the sample has been made to the dimensions required and with the tolerances specified. To prepare such a chart it is customary to provide a sheet of flat glass, plastic, or other material coated with a scribable substance, often an emulsion; the outline of the part is then incised by scribing through the coating on the glass or other materials. Following the scribing operation the scribed layout may be processed by any one of a number of ways to produce a chart or template suitable for use with a visual comparator or the use in other invironments. Customary scribing machines have been so constructed that the surface to be scribed is substantially horizontal. However, while such machines may be constructed to be satisfactorily accurate, their use entails rapid exhaustion of the operator, since he must bend his body to a considerable angle so that his eyes and hands will be in the proper position, consequently an operator cannot work more than an hour or two before becoming exhausted by the unnatural cramped position in which he must work. Those skilled in the art have contemplated the construction of a machine in which the work would be presented in a substantially vertical plane, but the problems of support and the maintenance of the necessary rigidity have not hitherto been overcome.

The principal object of this invention is to increase the efficiency and ease of operation of the scribing process.

Another object of the invention is to increase the accuracy with which coordinates can be scribed.

A further object of the invention is to facilitate the adjustment of key parts, both in order to reduce the expense of manufacture as well as to provide simple means by which the machine can be calibrated.

An important feature of the invention resides in a scribing machine including a horizontal bed plate provided with means for quickly bringing it into level position, a rotatable table supported in substantially vertical attitude above the bed plate, a carriage mounted fo motion horizontally above the bed plate and across the face of the scribing table, and a second carriage mounted for vertical movement along a pair of vertically extending bars mounted on the first carriage and provided with means by which the bars may be easily adjusted to make them parallel, and a third carriage mounted at the upper ends of the vertical bars and cooperating with guide means which are adjustable to bring both bars into parallelism with the surface of the table.

Another feature of the invention resides in the incorporation in the rotary table of an electroluminescent lamp by means of which a scribing plate may be back-lighted uniformly and without the generation of heat which would otherwise not only cause expansion of members of the machine and reduce accuracy but which would also deleteriously affect the material coated on a scribing plate.

Another feature of the machine resides in the combination of a tool holder mounted for vertical motion and containing both a magnifying scope and a scriber, the arrangement being such that the operator may first find a coordinate point on the scribing plate and then quickly slide the tool holder so that the scriber comes into position at the precise point previously indicated by the scope.

Other features of the machine reside in mechanisms for accomplishing various adjustments and vernier motions, the combination of which renders the machine capable of extremely precise operation.

These and other objects and features of the invention will be more readily understood and appreciated from the following detailed description of a preferred embodiment thereof selected for purposes of illustration and shown in the accompanying drawings, in which:

FIG. 1 is a view in front elevation showing a machine constructed in accordance with the invention, FIG. 2 is a view in cross-section taken along the line 2—2 of FIG. 1, FIG. 3 is a view in rear elevation of the clamp and slip ring structure at the rear of the shaft mounting the scribing table, FIG. 4 is a fragmentary view in front elevation showing the vernier scale at the periphery of the scribing table, FIG. 5 is a plan view of the horizontally sliding carriage and operating structure, FIG. 6 is a view in front elevation of the horizontally sliding carriage and associated mechanism, FIG. 7 is a view in cross-section along the line 7—7 of FIG. 6, FIG. 8 is a view in cross-section along the line 8—8 of FIG. 6, FIG. 9 is a view in cross-section along the line 9—9 of FIG. 1, FIG. 10 is a view in cross-section along the line 10—10 of FIG. 9, FIGS. 11 and 12 are views in cross-section along the line 11—11 of FIG. 9, showing the two positions of the carriage containing the scope and scriber, FIG. 13 is a view in front elevation of the upper horizontally sliding carriage, the cover being removed to show the interior, FIG. 14 is a view in cross-section along the line 14—14 of FIG. 13, and FIG. 15 is a view in cross-section along the line 15—15 of FIG. 13.

The principal instrumentalities of the scribing machine include a rotatable table 40 on which may be mounted a scribing plate 82; the rotating table 40 includes as an integral part a circular electroluminescent lamp 52 shielded by a disk of plate glass 78. A carriage 230 holds a scriber 258 and is mounted for vertical reciprocation on a pair of substantially vertical bars 154 and 162 mounted on a lower horizontally sliding carriage 150 which may be reciprocated by means of a hand wheel 117. The upper ends of the bars 154 and 162 are mounted in a header 190 having depending rollers 196 moving in contact with an angle iron 22 secured to a substantially vertical plate 20 which rests in turn upon a horizontal adjustably mounted bed plate 10. The scriber can be moved by the carriages to any point opposite the scribing plate 82, and a straight line may be inscribed on the plate 82 in any desired direction, since the table 40 may be rotated through any desired angle and clamped in position.

As best seen in FIG. 1 the machine is organized about a massive bed plate 10 supported by heavy columns or legs 12, each of which is provided at its bottom with an adjustable pad or jack screw 14. In using the machine it is imperative to mount it on a stable, level floor, or platform, and the pads 14 can then be adjusted to bring the bed plate 10 into precisely level condition.

Extending upwardly from the bed plate 10 is a plurality of jack screws 16 on the tops of which rest an elongated bar 18 running along the front of the bed plate 10 and serving as a horizontal guide rail. The rail 18 can be brought into perfectly level condition by adjusting the jack screws 16, and that is essential to proper operation of the machine. It is also an attractive feature of the machine of the invention, since the attitude of the rail is not permanently affected by the usual hazards of shipment and is intended to be adjusted as the first step in the installation of the machine constructed in accordance with the invention.

A broad massive casting in the form of an elongated rectangular plate 20 is provided with a broad heavy integral foot (not shown) bolted to the upper surface of the bed plate 10 and extends upwardly therefrom at an angle of about 10° from the vertical. That approximate degree of inclination is referred to herein as "substantially vertical." One function of the plate 20 is to support the rotatable table 40, and as shown in FIG. 2, the plate 20 is provided with a centrally located enlarged hub portion 24 in which there is journalled a shaft 26 supported on bearings 28 and 30 disposed within the hub. Secured to the rear end of the hub 24 by a bolt 33 is a split disk clamp member 32, best shown in FIG. 3. The disk 32 fits about the end of the shaft 26 and is cut away in one quadrant to provide a depending flange 36 through which passes a rod 34 having a threaded end working in a threaded socket in the adjacent quadrant of the disk 32. At its outer end the rod 34 carries a knurled hand wheel 38 by means of which the clamp 32 can be loosened or tightened about the shaft 26 in order to lock the shaft in adjusted position.

A massive circular steel plate shown generally at 40 and referred to as the "table" or "scribing table" is secured by means of bolts 50 to a heavy steel disk 48 locked to the shaft 26. The circular steel plate 40 has a peripheral rim 42 and a first recess formed by a shoulder 44 in which is disposed a heavy glass plate 78. A second shoulder 46 forms an inner circular recess in which is disposed a flat circular electroluminescent lamp 52 provided with electrodes 54 disposed in a hole 53 cut through the plate 40. Connected to the electrodes 54 is a pair of lead wires 56 which run along the back of the plate 40 (protected by a cover plate 58), through a bore in the disk 48, and thence through the interior of the shaft 26. Fixed to the inner end of the shaft 26 is a hub 60 integral with a hollow disk of insulating material provided with a peripherally extending reduced shoulder portion 64 on either side of which are fastened metal slip rings 66 and 68, each of which is connected to one of the wires 56. Secured to the clamp 32 is a block of insulating material 70 which carries a pair of inwardly directed brushes 72 and 74 of springy metal. The brush 72 slides on the slip ring 68, and the brush 74 slides on the slip ring 66. The brushes 72 and 74 are connected to lead wires 76 leading to the secondary of a transformer (not shown) arranged to supply the lamp with approximately 500 volts A.C.

The heavy disk 78 of plate glass which lies in the recess 44 in the plate 40 is provided with four equally spaced rotating eccentric clamping members 86, by means of which a square or rectangular scribing plate 80 may be mounted in position on the face of the plate 78 and over the lamp 52. The plate is provided with additional threaded sockets disposed at appropriate points, and the eccentric clamping members 86 may be inserted in different sets of the sockets in order to accommodate scribing plates of different dimensions. The scribing plate 80 forms no part of the invention, and it will be sufficient to say that in general it may comprise a piece of very flat glass coated as shown at 82 with a substance suitable for scribing; that is to say, a substance which the scriber can penetrate easily and make lines and marks which are clean in outline. The scribing plates involved are conventional and well known to those skilled in the art. The relative position of a scriber in front of the scribing plate 80 is shown in FIG. 2 at 84.

An integral tab 90 extends laterally from one side of the massive inclined plate 20 and has secured to it an arcuate plate 92. At one end the plate 92 is provided with an integral depending lip 94. Secured to the plate 92 is an overlying arcuate plate 96 having graduations of the vernier scale which cooperates with graduations 98 engraved in the peripheral rim 42 of the steel plate 40 and indicating degrees and minutes of arc. Integral with the plate 92 and adjacent the lip 94 is a boss 100 carrying a pivot pin on which is mounted a lever 102 in one end of which there is journalled a hard rubber roller 104 positioned to bear on the outer edge of the rim 42 and driven by a hand wheel 106. The lever 102 also carries a pivotally mounted rod 108 extending through a bore on the lip 94 and encompassed by a spring 110 secured by adjusting nuts 111, the arrangement being such that the spring 110 urges the lever 102 to press the roller 104 against the rim 42. At its other end the lever 102 is provided with a threaded bore in which works a set screw 112. By adjusting the set screw 112 it is possible to urge the lever 122 against the action of the spring 110 and thus vary the pressure of the driving wheel 104 against the rim 42. By revolving the hand wheel 106 it is thus easily possible to rotate the entire table 40 together with electroluminescent lamp, and the scribing plate 82. The vernier scale on the plate 96 makes it possible to move the plate through any given angle with an accuracy of greater than thirty seconds of arc.

We come now to a description of the mechanism employed for horizontal reciprocation of the scriber, for which FIGS. 5 and 6 will be the most useful references. Secured to the bed plate 10 is a rack 114 on which works a pinion 115 fast on the end of a shaft 116 journalled for rotation in an elongated heavy metal plate 118 forming the main member of a carriage. Fast upon the plate 118 are three bearing housings 120, an example of which is best shown in FIG. 8 where it will appear that there is an arcuate outer housing 120 welded to the plate 118 and containing an inner split race of ball bearings 122 so arranged that the balls roll upon the surface of the main guide rail 18 which runs horizontally along the base plate 10, as previously described. On the other end of the shaft 116 there is provided a hand wheel 117 by means of which the pinion is operated to move the plate 118 and the bearing housings 120 in horizontal reciprocation.

In order to provide for a fine adjustment of the horizontal position of the carriage, a clamp, best shown in FIG. 7 at 124, embraces the guide rail 18 and contains a pad 128 operated by a threaded shaft 126 on the end of which is mounted a hand wheel 130. The hand wheel 130 may thus be operated to press the pad 128 against the guide rail 118 and immobilize the clamp 124. The clamp carries at its upper end a yoke shaped bracket 132 through which passes a threaded shaft 134 on which there is mounted, within the yoke of the bracket, a threaded knurled roll working on the shaft 134. The shaft 134 is secured at one end in a bracket 138 made fast to the top of the center bearing housing 120. When the clamp is immobilized and the roller is turned, the shaft 134 is moved horizontally, thus thrusting the center bearing housing 120 and serving to shift the entire carriage assembly laterally. To accommodate that movement the carriage plate 118 is slotted to receive the shank of the clamp 124. To serve as a brake on the movement of the roller 136, a springy metal leaf 142 is secured to the plate 118 by means of a bolt 140, and the plate 142 is apertured to receive the rod 126. Disposed on the rod 126 is a bushing 144 and a hand wheel 146 by means of which the bushing 144 can be urged against the leaf 142 and thereby impart a greater or lesser frictional resistance to the motion of the carriage with respect to the immobilized clamp 124.

When it is desired to move the carriage any considerable amount, the hand wheel 130 is backed off to release the grip of the clamp 124 on the rail 18, and the hand wheel 117 is actuated to move the entire carriage the desired amount. Then in order to get a fine adjustment, the hand wheel 130 is turned to immobilize the clamp 124 with respect to the rail 18, the hand wheel 146 will have been adjusted to provide the proper frictional resistance, and the roll 136 is then turned in a desired direction to cause movement of the carriage through a relatively small amount. On the right hand end of the carriage plate 118 there is fastened a metal box 168 carrying a plate 172 engraved with a vernier scale juxtaposed to a scale 170 mounted on the bed plate 10. In the upper part of the box 168 there is provided a viewing window 173 in which may conveniently be mounted a magnifier. The structures above described may thus be used to move the carriage to a predetermined position as read on the scales 170 and 172 through the window 173.

We now come to describe the mechanism by means of which the scriber can be reciprocated vertically.

Secured to the plate 118 by means of a bolt 151 is a casting 150 in the form of a box provided adjacent one end with a socket 152 receiving the lower end of an elongated vertically extending bar 154 clamped in the socket by a bolt 156 operating through a pad on the front of a plate 118. At the opposite end of the casting 154 there is a second socket 160 receiving the lower end of a second elongated vertically extending bar 162. In the walls of the socket 160 there are provided adjusting bolts 164 and 166 by means of which the lower end of the bar 162 can be shifted laterally by a small amount. As will be obvious, the bolt 151 may be loosened and the entire casting 150 translated laterally by manipulation of the bolt 156, the bolt 151 being received in a slot shown in dotted lines in FIG. 5.

As shown best in FIGS. 5 and 6, the box-like casting 150 is provided with a cover plate 174 on which is fastened the lower end of a vertically extending scale 176, which extends upwardly between the two bars 154 and 162. Now, with reference to FIGS. 13–15, it can be seen that the upper ends of the bars 154 and 162 are received in a box-like header 180 provided with a socket 181 for receiving the upper end of the bar 162 and a socket 186 for receiving the upper end of the bar 154. The socket 181 is provided with a pair of opposed set screws 182 and 184 by means of which the upper end of the bar 162 can be shifted laterally by a small amount. The sockets 181 and 186 are protected by a pair of cover plates 188 and 190 on which is mounted the upper end of the scale 176. Secured to the casting header is a flat plate 192 adjacent each end of which there is mounted a pair of studs 194 on which in turn are mounted eccentric plates 198 which carry depending rollers 196 so arranged that between each pair of rollers 196 there is disposed the upstanding member of an angle iron 22 which is welded or otherwise secured to the top of the main back plate 20. The rollers 196 may be adjusted through manipulation of the eccentrics 198 either to twist the plate 192 in a substantially horizontal plane or to move the plate 192 bodily in and out thus similarly moving the header 180 and the upper ends of the bars 154 and 162. That adjustment is provided so that the bars may be brought into parallelism with the surface of the scribing plate 82.

Mounted on the top of the plate 192 is a reversible motor 200 coupled to a reduction gear disposed in a casing 202 and having an output shaft 204 on the end of which is fixed a reel 206 carrying a wire cable 208 which leads down behind the scale 176 and between the bars 154 and 162. Secured to the lower end of the cable 208 is the carriage carrying the scriber, which will be described later.

Secured to one end of the header 180 is a pad 212 carrying a bolt 214 secured in the ends of a clevis 216 having a threaded socket receiving the upper threaded end of an inclined bar 218. The lower end of the bar 218 is threaded into another clevis 220 secured in a pad eye 222 fastened to the left hand end of the carriage plate 118 (see FIG. 6). The ends of the bar 218 are oppositely threaded so that the bar may be employed as a turnbuckle to tilt the bars 154 and 162 to bring them exactly perpendicular to the rail 18, it being understood that the degree of adjustment is very fine.

A carriage 230 is provided with four bearing housings 232 similar in structure to the bearing housings 120 and providing easy sliding movement of the carriage 230 along the bars 154 and 162. Secured to the outer face of the carriage 230 is a housing 234 within which is mounted a lamp 236 shielded so that its light is directed primarily on the surface of the scale 176; the housing 234 also carries a magnifying glass 238 disposed to magnify the readings on the scale 176, and a vernier scale plate 240 is fastened to the surface of the carriage 230 adjacent the focal point of the magnifier 238 and in the field of illumination of the lamp 236. Journalled laterally in the carriage 230 is a rod 246 having oppositely threaded portions carrying threaded sleeves 244 each of which is pivotally connected to an upwardly inclined toggle arm 242 pivoted on a pin 243 secured to the lower end of the cable 208. The rod 246 may be rotated by means of a hand wheel 248 fixed to its outer end. The reversible motor 200 is controlled by a switch 270 fastened to the side of the carriage and so arranged that when the switch arm is moved upwardly, the motor and reduction gearing will haul the carriage 230 upwardly, while a downward movement of the switch arm will cause the carriage to lower. When the carriage has nearly approached the desired position, as shown on the vernier scale 240 against the scale 176, the motor is stopped. Then the final, small movement is obtained by manipulating the hand wheel 248 which expands or contracts the toggle 242 to move the carriage up or down.

At one side of the carriage 230 there is provided a box 250 open at the front end at the back and provided with a cover plate 251 having a vertical slot. Within the box 250 is mounted a tool holder in the form of a block 252 having through and through superposed apertures in the upper of which is mounted a tool such as a scriber having a barrel portion 258 and a scribing element 260, the position of which is controlled by a spring 261 mounted in the barrel. Of course any suitable tool or scriber may be mounted in the same fashion in the tool holder 252. In the lower aperture there is mounted a telescope 254 held in position by a set screw 256. The barrel 258 of the scriber is held in its aperture by means of a set screw 262, and the shanks of both set screws work in a slot (not shown) in the side plate 251. There is also provided a third set screw 264 threaded in the cover plate 251 and entering one of two superposed recesses in the side wall of the block 252.

In FIG. 12 the block is shown in its upper position in which the scriber is out of play and the telescope focused on the scriber plate 82 at the precise point determined by the horizontal movement of the carriage 118 and the vertical movement of the carriage 230. In the course of making a layout chart the operator very often has to come back to a reference point, and he operates the controls of the carriages to reach that point. By observing through the telescope and simultaneously manipulating the controls, he can move the carriage 230 until the telescope is focused exactly on the desired point. Then he releases the set screw 264 to permit the block 252 to slide down in the box and bring the scriber 260 into precise position opposite the desired point. He may then advance the scriber into operating position and lock it there by means of the set screw 262. To provide such a precise substitution of the scriber for the telescope, set screws 266 and 268 are provided in the top and bottom walls of the box 250 so that the two positions of the block 252 may be precisely arrived at.

We now come to describe the adjustments provided to bring the positions and motions into proper relationship. In the first place the bed plate 10 may be brought into level position by manipulation of the pads 14 on the lower ends of the columns 12 which support the bed plate 10. Then guide rail 18 may be leveled by appropriate manipulation of the jack screws 16. When that has been accomplished the carriage 118 will move precisely in a horizontal direction.

We are then concerned with bringing the upright bars 154 and 162 into parallelism with the face of the scribing plate 82. By adjusting the eccentrics 198 controlling the positions of the rollers 196, the upper ends of the bars may be slightly twisted to accomplish that result. Also the same eccentrics may be used to move the bars bodily in and out with respect to the scriber plate.

Since the scriber must not only be moved horizontally in precise fashion, but also vertically exactly at right angles to the path of horizontal movement, it is necessary to provide means for tilting the bars 154 and 162. The bar 154 is clamped securely at its upper and lower ends, but the bar 162 is capable of being moved in either the upper or the lower socket by manipulating the set screws 164 and 166 in the lower socket and the set screws 182 and 184 in the upper socket. Moreover the bar 218 may be rotated in its sockets effectively to increase or reduce the hypotenuse distance between the pad 222 on the carriage plate 118 and the pad 212 on the left hand end of the upper casting 180.

Because it is not possible to produce bars which are perfectly straight, it is desirable to provide means for compensating for bends therein. In the machine of the present invention that may be accomplished by loosening the bars in their sockets and rotating them to various positions, moving the carriage 230 vertically as a check. For example, a layout chart may be prepared with accurately scribed horizontal and vertical center lines and secured in position on the rotary table 40. The table is then brought to the zero position, as read on the scale shown in FIG. 4. The hand wheel 117 is then manipulated until the telescope 254 shows that the scriber will lie on the center line. Finally the switch 270 is manipulated to cause the carriage 230 to be reciprocated vertically along the bars 154 and 162. Any departure from true vertical movement will be observed through the telescope and can generally be corrected by loosening the bar 162 in its socket and rotating it until no departure from vertical is observed. In extreme cases it may be necessary to rotate the bar 154 until a more favorable distribution of the bend is achieved. These various adjustments must be made when the machine is installed but for the most part, the adjustments will be permanent, although the machine should of course be checked periodically.

When it comes to the use of the machine, it must be kept in mind that it can be operated to scribe straight lines by reference to coordinates taken from the X and Y axes. It cannot accurately scribe a curved line. When a curve is required, it is necessary to establish a number of points derived by reference to the X and Y coordinates, a sufficient number of points per unit distance being required in order to establish the configuration of the desired curve. In such instances the points are scribed on the scribe plate, and the curved line is scribed later on with the aid of a batten, French curve, railroad curve, or the like.

Straight lines may be scribed either horizontally or vertically or at any angle therefrom. The angle at which such a line departs from the vertical or the horizontal is set by rotating the table 40, using the hand wheel 106 in the vernier scale as shown in FIG. 4.

The machine of the invention affords numerous advantages. To begin with the adjustments secured by the rotation of the shafts 154 and 162, coupled with the adjustment of the bed plate 10 and the guide rail 18, sharply reduce the cost of manufacture. Of course the machine must be manufactured to close tolerances, but all the final adjustments can be made upon installation, with obvious savings. Moreover the life of the machine is practically infinite, since if any of the parts go out of adjustment, they can easily be brought back into proper calibration. Moreover, the individual parts can easily be replaced when worn.

The employment of electroluminescent lighting is of particular value, since such a lamp gives uniform light throughout its area and generates no heat. Consequently there is no adverse effect upon the sensitive material of the scriber plate or any maladjustment brought about by the expansion of portions of the machine. There is another important advantage arising from the use of an electroluminescent lamp in the environment of the machine of the invention. Electroluminescent lamps are characterized by a constant output and the light is not subject to cyclic variations; consequently the operator is not disturbed or distracted by the flickering which is characteristic of other types of lighting, particularly fluorescent.

The fine adjustment mechanism for the vertical position of the carriage 230, as shown in FIG. 10, involving the rod 246 and the toggle arms 242 is a most satisfactory and inexpensive means of providing the necessary precision, as is the case with the fine adjustment for the horizontal motion shown in FIG. 7 and involving the clamp 124 in the roll 136. The adjustment of the upper ends of the bars 154 and 162 by means of the eccentrically mounted rollers 196 is also a most simple, effective and inexpensive means of securing precise adjusting movement. Finally, the sliding block carrying both the telescope and the scriber, shown best in FIGS. 11 and 12, results in a great saving of time, since the scriber can be brought into operating position very rapidly and surely, as soon as the telescope shows that the proper position has been reached.

While all the foregoing features are novel and valuable, the greatest overall advantage of the machine of the invention comes from the fact that an operator can work while his body is in a natural and comfortable position. It is not necessary to bend over and put the body in an unbalanced position. Consequently an operator can easily work for several hours and thus produce much more useful work per day than has hitherto been found possible by operators working on machines where the work is presented in the horizontal attitude.

Having now described and illustrated a preferred embodiment of our invention that we claim as new and desire to secure by Letters Patent of the United States is:

1. A scribing machine comprising a base, a plurality of jack screws mounted in said base, a horizontal guide rail mounted on said jack screws for adjustment to precise horizontal position, a support fixed rigidly to said base, a table rotatably mounted in substantially vertical position on said support, a further horizontal guide fixed on said support in spaced parallel relation to said guide rail, a header mounted to slide horizontally on said further guide, a first carriage mounted to slide horizontally on said guide rail, a plurality of parallel substantially vertical guide bars mounted at first ends thereof on said carriage and at second ends thereof on said header for horizontal movement therewith in parallelism with said table, at least one of said guide bars being mounted adjustably in said header and said first carriage for adjustment parallel to said table for correction of deviation from true parallelism of said one guide bar relative to the other guide bar, means adjustably mounting said guide bars for adjusting movement relative to said table to correct deviation of each of said guide bars from true parallelism with said table, means for adjusting the angular relationship between the guide bars and the horizontal guide rail to bring the guide bars into precise perpendicular relation to the guide rail, a second carriage mounted to slide perpendicularly to said guide rail on the guide bars, and a scribing tool secured to said second carriage in position to play over the table.

2. A scribing machine as recited in claim 1, in which said guide bars are of thermally-expansible material such that a heat-generating lamp would distort said guide bars from their adjusted parallel and perpendicular relationships and thus interfere with the accuracy of the machine, together with an electroluminescent lamp mounted on said table for illumination of the table surface without heating and distorting said guide bars.

References Cited by the Examiner

UNITED STATES PATENTS

| | | | |
|---|---|---|---|
| 1,116,231 | 11/14 | Bramwell | 33—79 |
| 2,126,896 | 8/38 | Koller | 33—174 |
| 2,211,566 | 8/40 | Henderson | 33—78 |
| 2,365,503 | 12/44 | White | 33—26 |
| 2,462,573 | 2/49 | Turrettini | 33—189 X |
| 2,667,691 | 2/54 | Marton | 33—32 |
| 3,059,337 | 10/62 | Lynch | 33—32 |
| 3,104,475 | 9/63 | Boeijinga | 33—184.5 |

FOREIGN PATENTS

| | | |
|---|---|---|
| 1,126,288 | 7/56 | France. |
| 806,004 | 12/58 | Great Britain. |
| 274,271 | 6/51 | Switzerland. |

ISAAC LISANN, *Primary Examiner.*